(12) United States Patent
Matsunaga

(10) Patent No.: US 8,043,121 B2
(45) Date of Patent: Oct. 25, 2011

(54) CONNECTOR

(75) Inventor: Akihiro Matsunaga, Tokyo (JP)

(73) Assignee: Japan Aviation Electronics Ind., Ltd., Tokyo (JP)

( * ) Notice: Subject to any disclaimer, the term of this patent is extended or adjusted under 35 U.S.C. 154(b) by 0 days.

(21) Appl. No.: 12/992,310

(22) PCT Filed: Apr. 1, 2009

(86) PCT No.: PCT/JP2009/056809
§ 371 (c)(1),
(2), (4) Date: Nov. 12, 2010

(87) PCT Pub. No.: WO2009/139232
PCT Pub. Date: Nov. 19, 2009

(65) Prior Publication Data
US 2011/0070776 A1 Mar. 24, 2011

(30) Foreign Application Priority Data
May 14, 2008 (JP) ................................. 2008-127492

(51) Int. Cl.
*H01R 24/00* (2006.01)

(52) U.S. Cl. ...................................................... 439/629

(58) Field of Classification Search .......... 439/629–631, 439/326–331, 72–73, 260, 157, 159
See application file for complete search history.

(56) References Cited

U.S. PATENT DOCUMENTS

| | | | |
|---|---|---|---|
| 5,813,878 A * | 9/1998 | Kuwata et al. | 439/326 |
| 6,471,550 B2 * | 10/2002 | Maiterth et al. | 439/631 |
| 7,232,326 B2 | 6/2007 | Uchida et al. | |
| 2004/0067673 A1 * | 4/2004 | Matsunaga et al. | 439/331 |

FOREIGN PATENT DOCUMENTS

| | | |
|---|---|---|
| JP | 11-185904 A | 7/1999 |
| JP | 2006-85987 A | 3/2006 |
| JP | 2006-210126 A | 8/2008 |

OTHER PUBLICATIONS

International Search Report dated Jun. 2, 2009 issued in International Appln. No. PCT/JP2009/056809.

* cited by examiner

*Primary Examiner* — Edwin A. Leon
(74) *Attorney, Agent, or Firm* — Holtz, Holtz, Goodman & Chick, P.C.

(57) ABSTRACT

To provide a connector which is capable of reducing the possibility that a cover is removed due to a cause other than an operation of removing a card when the cover is in a locked position, even if a height of the connector is reduced. A cover 7 which covers an upper surface of an IC card 21 accommodated in an accommodating section 33 of a housing 3 is pivotally mounted on the housing. The cover 7 is formed by a cover main body 71 which is opposed to the upper surface of the IC card 21 accommodated in the housing 3, arm portions 74 and 74 which are connected to the cover main body 71, shaft portions 75 and 75 which are connected to the arm portions 74 and 74, respectively, and are pivotally supported by respective slots 321a formed in respective side plates 312 of the housing 3. The arm portions 74 and 74 are capable of being elastically deformed, and being brought into contact with opposite sides of the IC card 21 accommodated in the housing 3. The shaft portions 75 and 75 are inserted through the respective slots 312a and 312a from the accommodating section 33 of the housing 3.

6 Claims, 17 Drawing Sheets

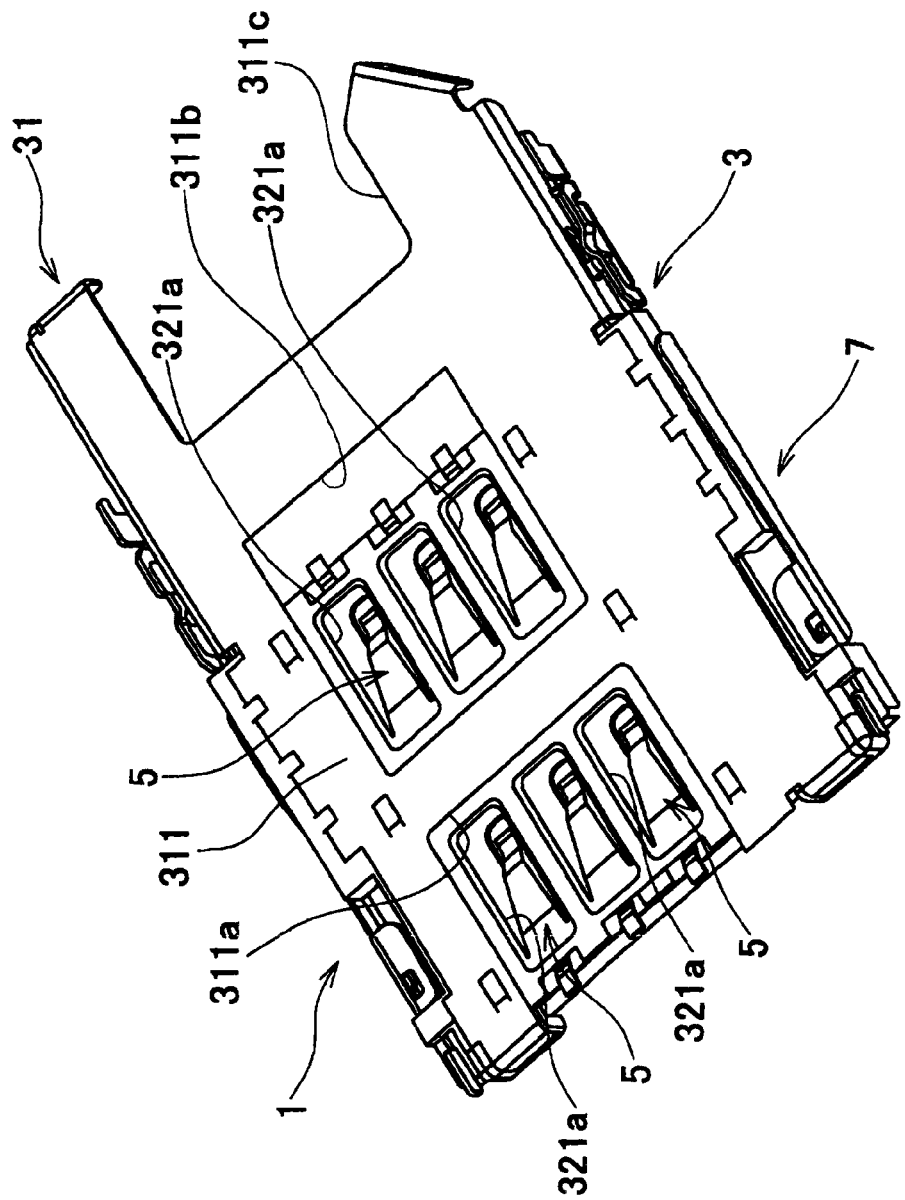

CONNECTOR

This application is a U.S. National Phase Application under 35 USC 371 of International Application PCT/JP2009/056809 filed Apr. 1, 2009.

FIELD OF THE INVENTION

The present invention relates to a connector, and more particularly to a connector for connecting a card-like object to be connected, such as an IC card, to a printed circuit board or the like.

BACKGROUND ART

Conventionally, there has been proposed a connector of this kind, comprising an insulator, contacts, and a cover (see Japanese Laid-Open Patent Publication (Kokai) No. 2006-85987).

The insulator includes an accommodating portion for accommodating a card, such as an IC card.

The contacts are held by the insulator.

The cover is pivotally mounted on the insulator. Further, the cover is capable of moving between a locked position and an open position along a longitudinal direction of the insulator. When the cover is in the locked position, the cover is locked to the insulator. When the cover is in the open position, the cover is unlocked from the insulator, and at the same time can be opened.

The cover is formed by blanking and bending a metal plate. The cover includes first and second card-holding portions for holding a card, a pair of arm portions, and a pair of shaft portions. A cross-section of each of the first and second card-holding portions is U-shaped. The pair of arm portions are each substantially leaf spring-shaped, and are each capable of being elastically deformed in a direction of a width of the card. The pair of shaft portions are each disposed on an inner surface of the respective arm portions (surface toward the card), and each protrude toward the card. The shaft portions are inserted into respective recesses formed in one end of the insulator from outside the insulator.

To mount the card in the connector, the cover is opened by sliding the cover to the open position, and the card is inserted into the first and second card-holding portions of the cover.

Thereafter, the cover is closed and is slid to the locked position.

When the cover reaches the locked position, contact portions of the contacts are brought into contact with pads of the card. As a result, the card is electrically connected to the connector.

To remove the card from the connector, it is only necessary to perform the above-mentioned mounting operation in reverse order.

In this connector, since the arm portions are capable of being elastically deformed in the width direction of the card, it is possible to insert and remove the shaft portions of the cover into and from the recesses of the insulator, so that it is possible to mount and remove the cover to and from the insulator with ease.

LITERATURE OF PRIOR ART

Patent Literature

Patent Literature 1: Japanese Laid-Open Patent Publication (Kokai) No. 2006-85987

SUMMARY OF THE INVENTION

Problem to be Solved by the Invention

Recently, there is a demand for reduction of the height of connectors, and to meet the demand, it is necessary to reduce the thickness of a cover.

However, if the thickness of the cover is reduced, since the cover has its portions integrally formed, rigidity of arm portions are lowered, so that there is a fear that, for example, if the connector drops down in a state where the cover is in the locked position, the arm portions are twisted to cause the shaft portions to be removed from the recesses of the insulator, causing detachment of the cover.

The present invention has been made in view of these circumstances, and an object thereof is to provide a connector which makes it possible to reduce the possibility that a cover is removed due to a cause other than an operation of removing a card when the cover is in the locked position, even when the height of the connector is reduced.

Means for Solving the Problems

To solve the above-mentioned problems, the present invention provides a connector comprising a housing that accommodates a card-like object to be connected, contacts that are held by the housing and are brought into contact with the card-like object to be connected which is accommodated in the housing, and a cover that covers an upper surface of the card-like object to be connected which is accommodated in the housing, wherein the cover includes a cover main body that is opposed to an upper surface of the card-like object to be connected which is accommodated in the housing, a pair of arm portions that are continuous to the cover main body, and are capable of being elastically deformed, and capable of being brought into contact with opposite sides of the card-like object to be connected which is accommodated in the housing, and shaft portions that are continuous to the pair of arm portions, respectively, and are inserted through respective bearings formed in opposed wall portions of the housing, from inside the housing, and pivotally supported by the respective bearings.

As described above, since the cover includes the arm portions which are capable of being brought into contact with the opposite side surfaces of the card-like object to be connected which is accommodated in the housing, when the card-like object to be connected is accommodated in the housing, the arm portions cannot be deformed in the width direction of the card-like object to be connected, which prevents the shaft portions from being removed from the respective bearings.

Preferably, each bearing is a slot which extends in a predetermined direction, and each shaft portion is supported by the slot in a manner movable between a locked position in which the cover main body is locked to the housing and an unlocked position in which the cover main body can be opened.

Preferably, the housing is provided with limiting means for limiting movement of each shaft portion in the locked position toward the unlocked position, and limiting movement of each shaft portion in the unlocked position toward the locked position.

Preferably, the limiting means includes spring a portion which is brought into contact with each shaft portion by a predetermined force, when the limiting means moves the shaft portion between the locked position and the unlocked position.

Effects of the Invention

According to the present invention, even when the height of the connector is reduced, it is possible to reduce the possibility that the cover is removed due to a cause other than the operation of removing the card when the cover is in the locked position.

BRIEF DESCRIPTION OF DRAWINGS

FIG. 1C is a perspective view of the connector shown in FIG. 1B in a state in which the connector is inverted upside down.

BEST MODE FOR CARRYING OUT THE INVENTION

Hereafter, an embodiment of the present invention will be described with reference to the drawings.

As shown in FIGS. 1A to 1E, a connector 1 comprises a housing 3, contact 5, and a cover 7. The connector 1 is mounted on a printed circuit board, not shown, and electrically connects an IC card (card-like object to be connected) 21 accommodated in the connector 1 and the printed circuit board.

Figure 1A:
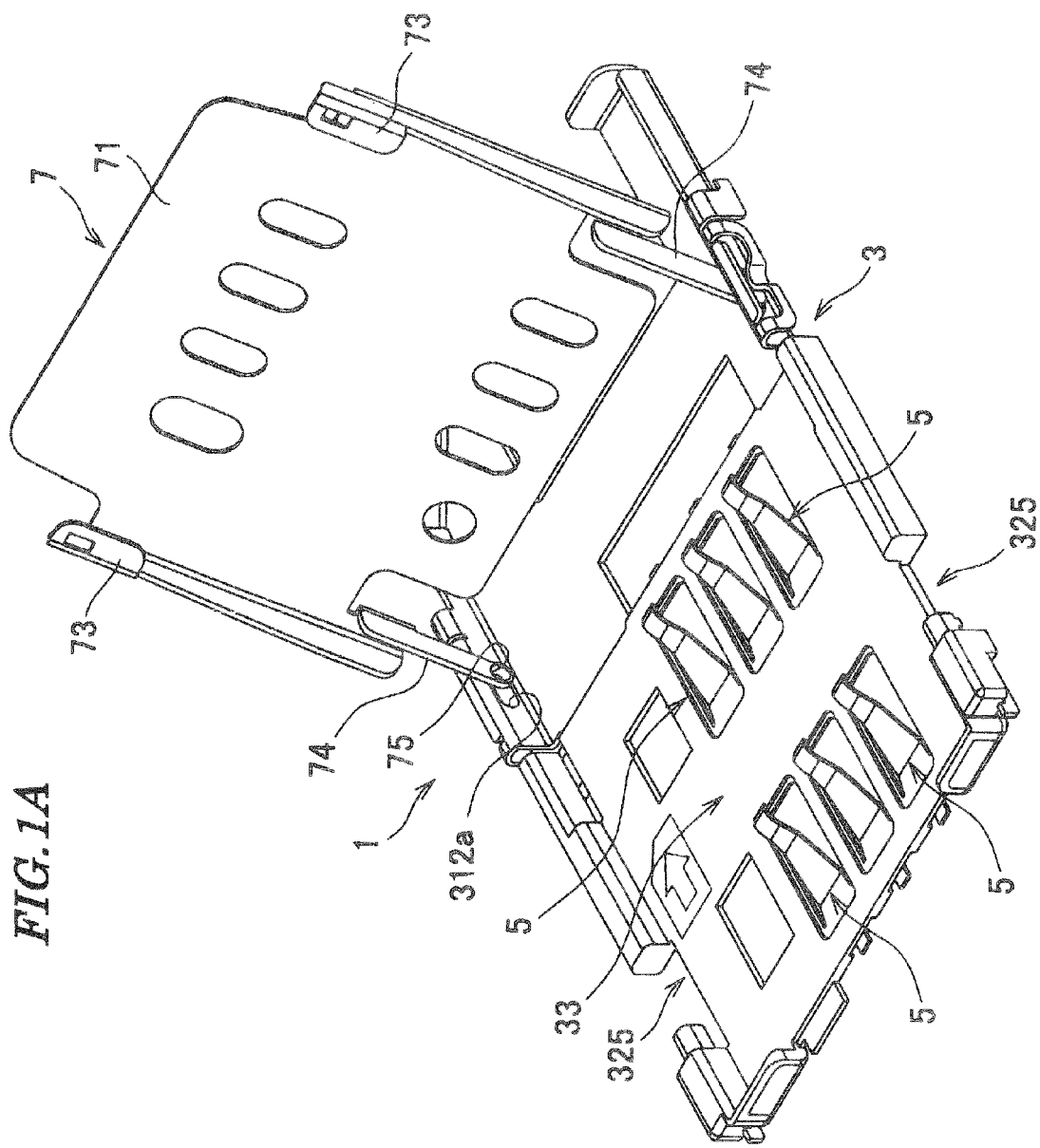
FIG. 1A is a perspective view of a connector according to a first embodiment of the present invention in a state in which a cover is opened and before an IC card is accommodated in a housing.
Figure 1B:
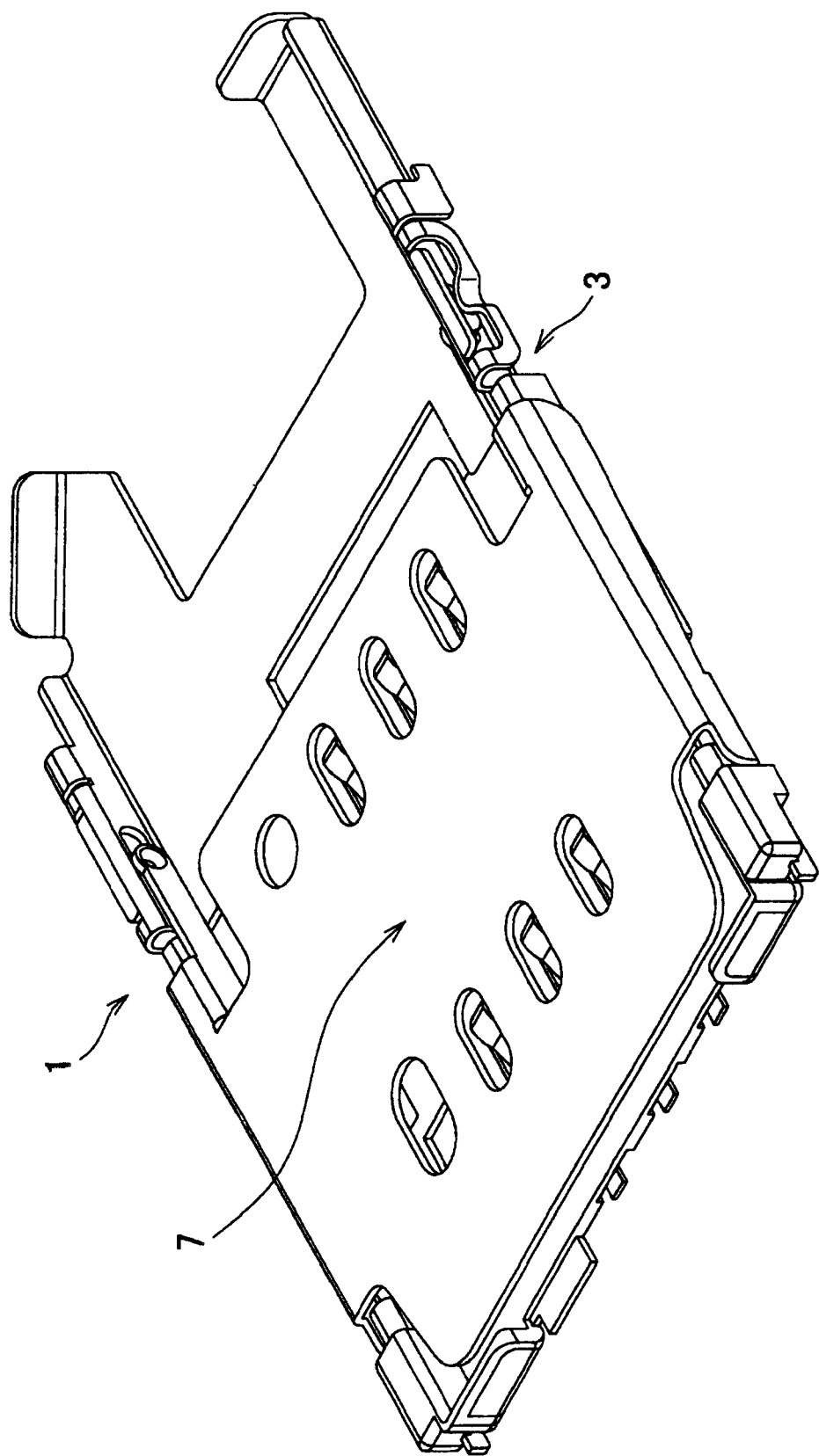
FIG. 1B is a perspective view of the connector in a state in which the cover is closed without accommodating the IC card in the housing.
Figure 1D:
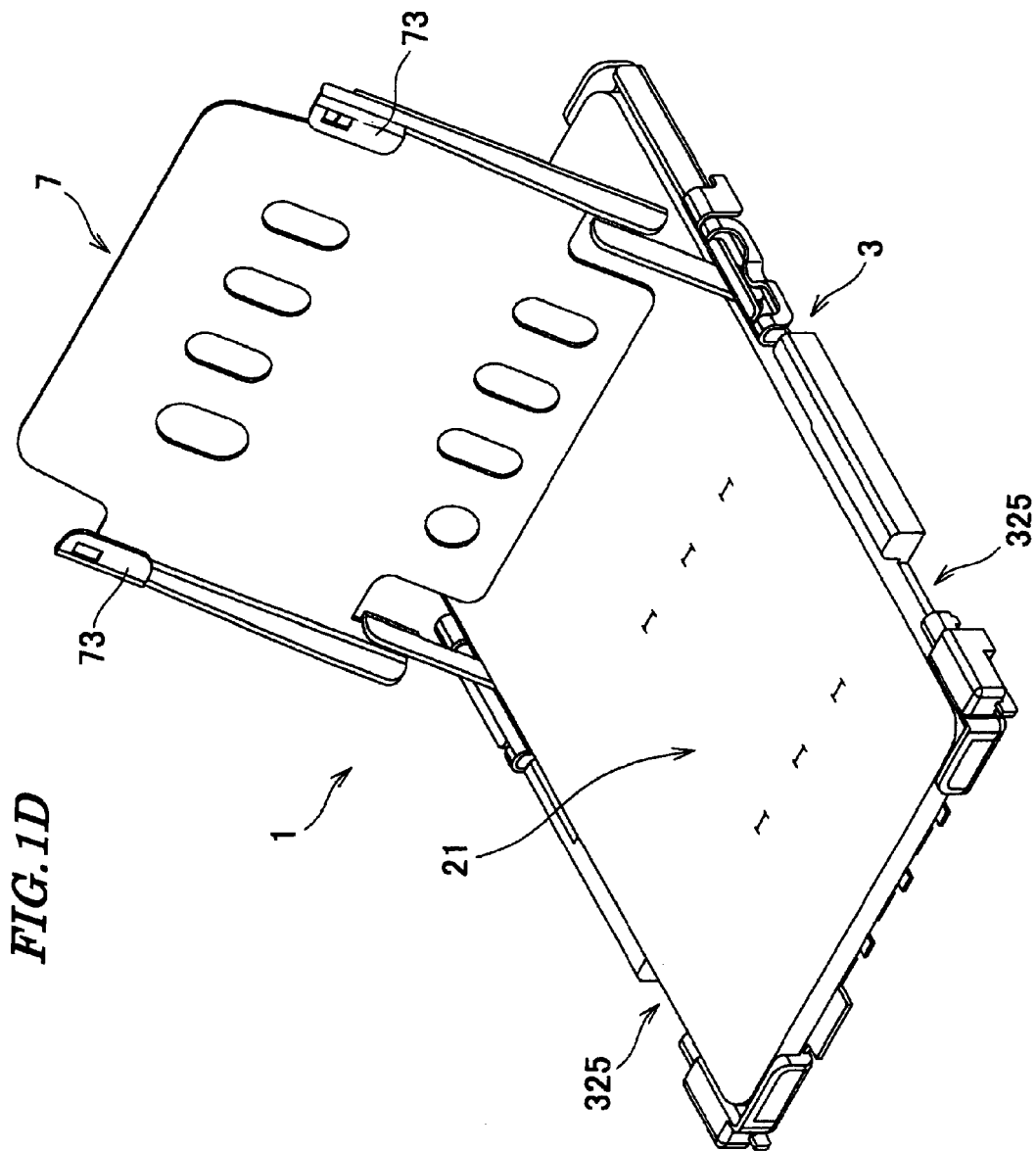
FIG. 1D is a perspective view of the connector shown in FIG. 1A in a state in which the IC card is accommodated in the housing.
Figure 1E:
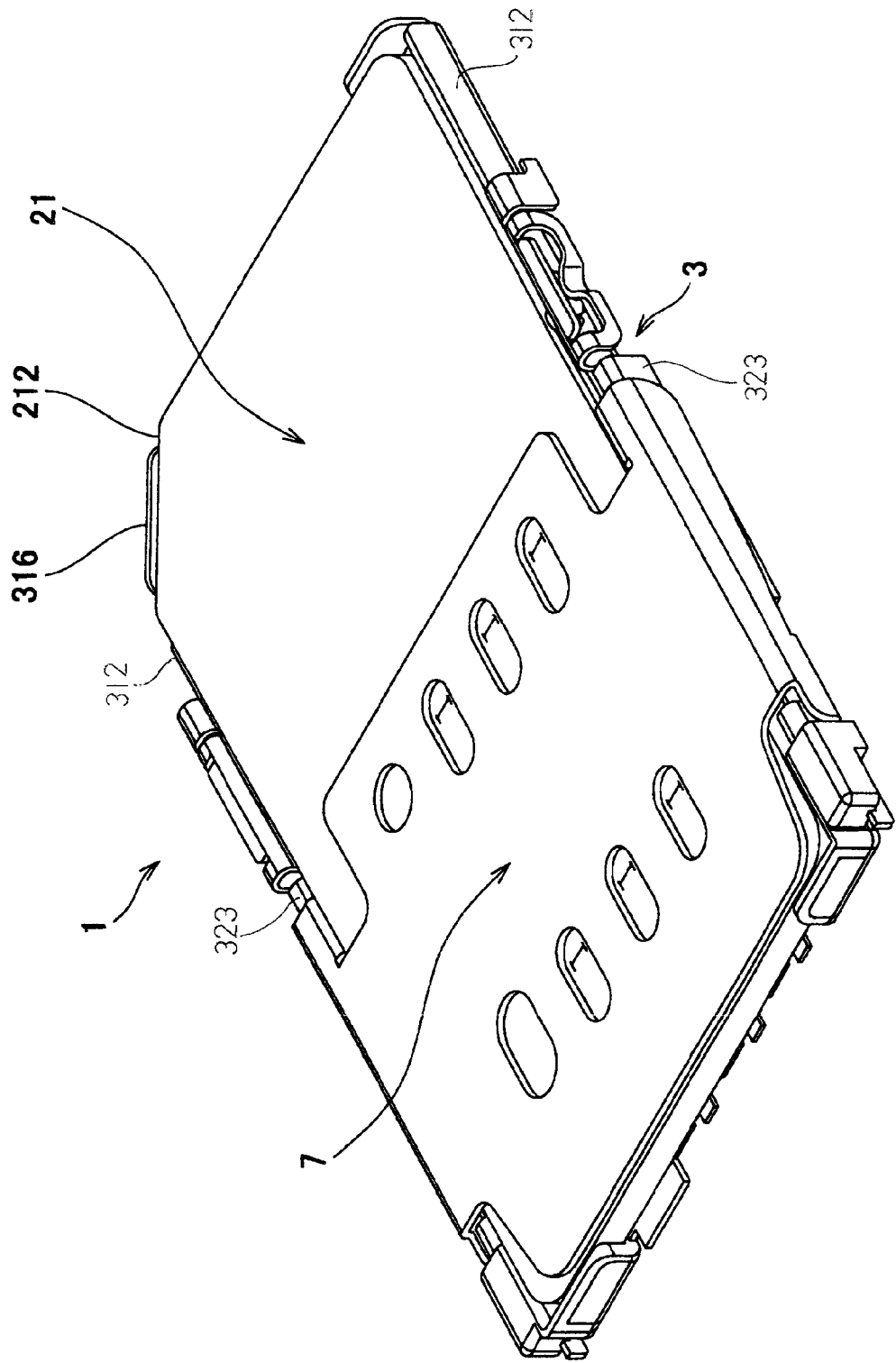
FIG. 1E is a perspective view of the connector shown in FIG. 1A in a state in which the IC card is accommodated in the housing, and the cover is closed.
Figure 2:
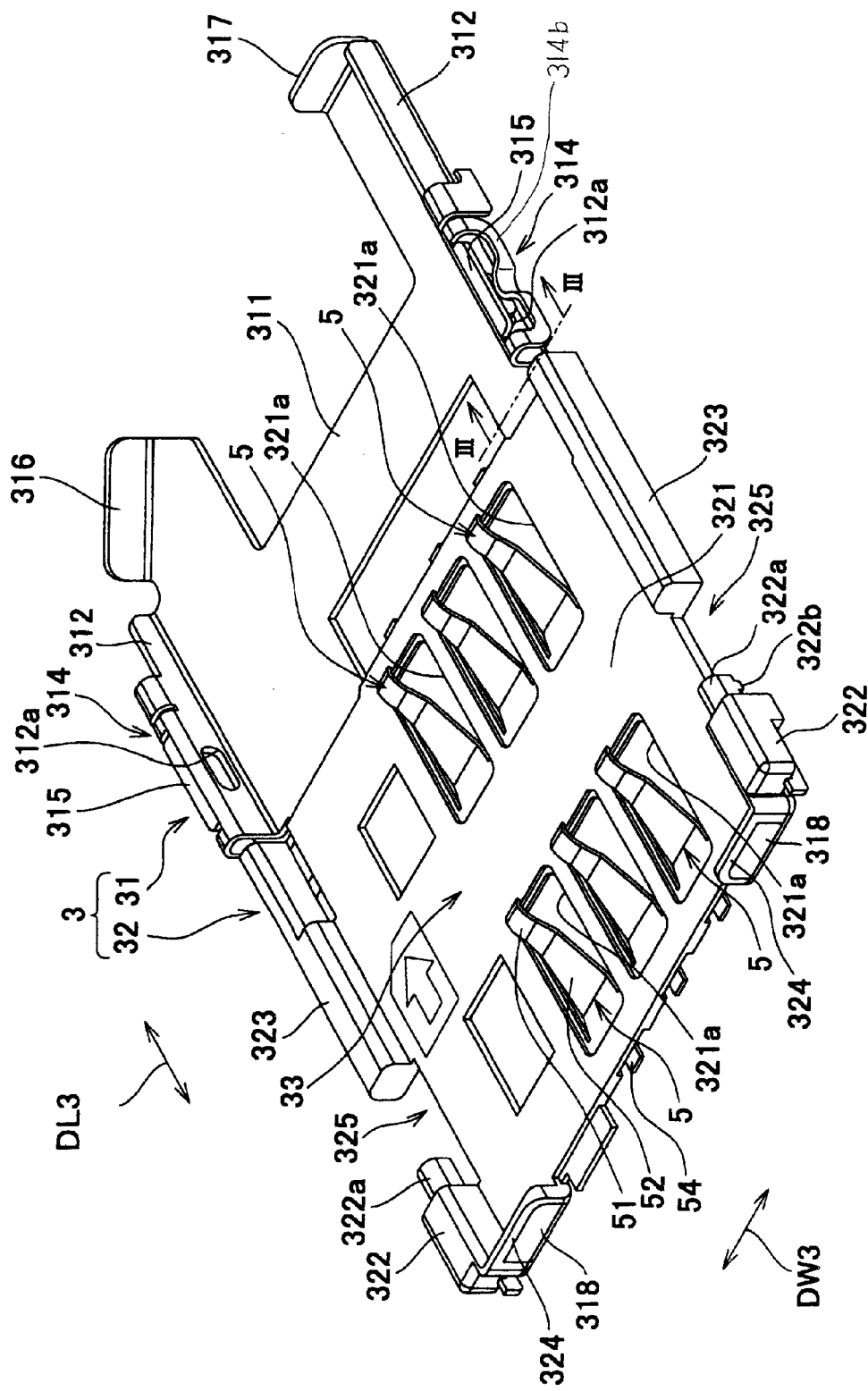
FIG. 2 is a perspective view of the housing of the connector shown in FIG. 1A.
Figure 3:
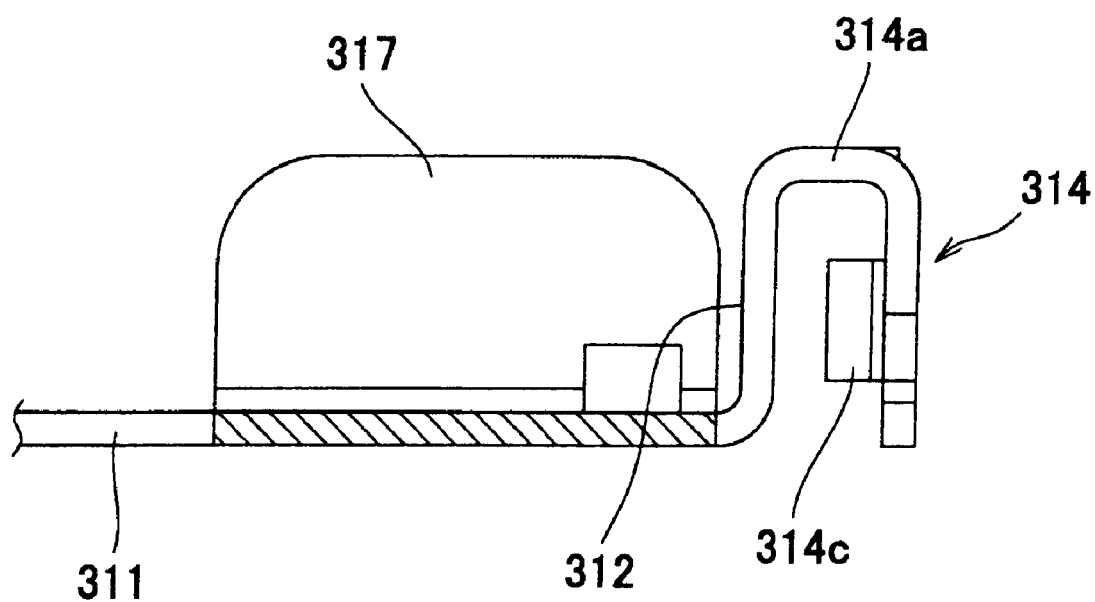
FIG. 3 is a cross-sectional view taken along III-III in FIG. 2.
Figure 4:
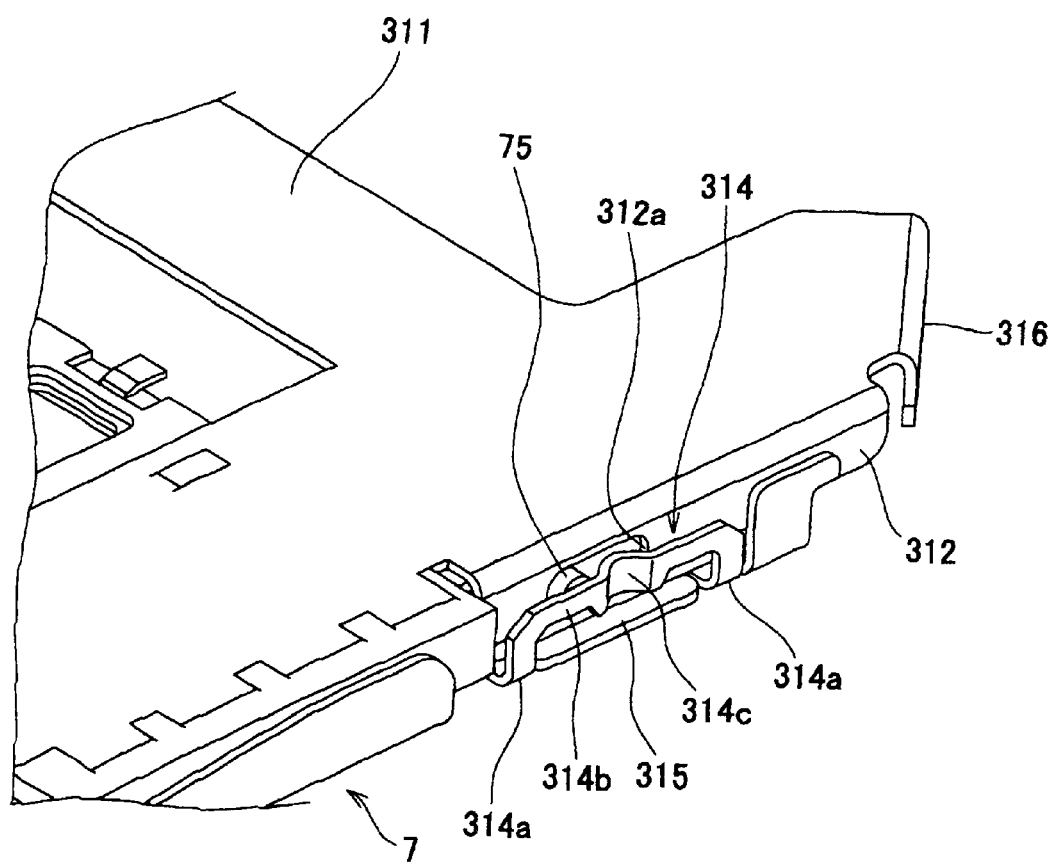
FIG. 4 is an enlarged view of part surrounding a position-limiting portion in a state in which the connector shown in FIG. 2 is inverted upside down.
Figure 5:
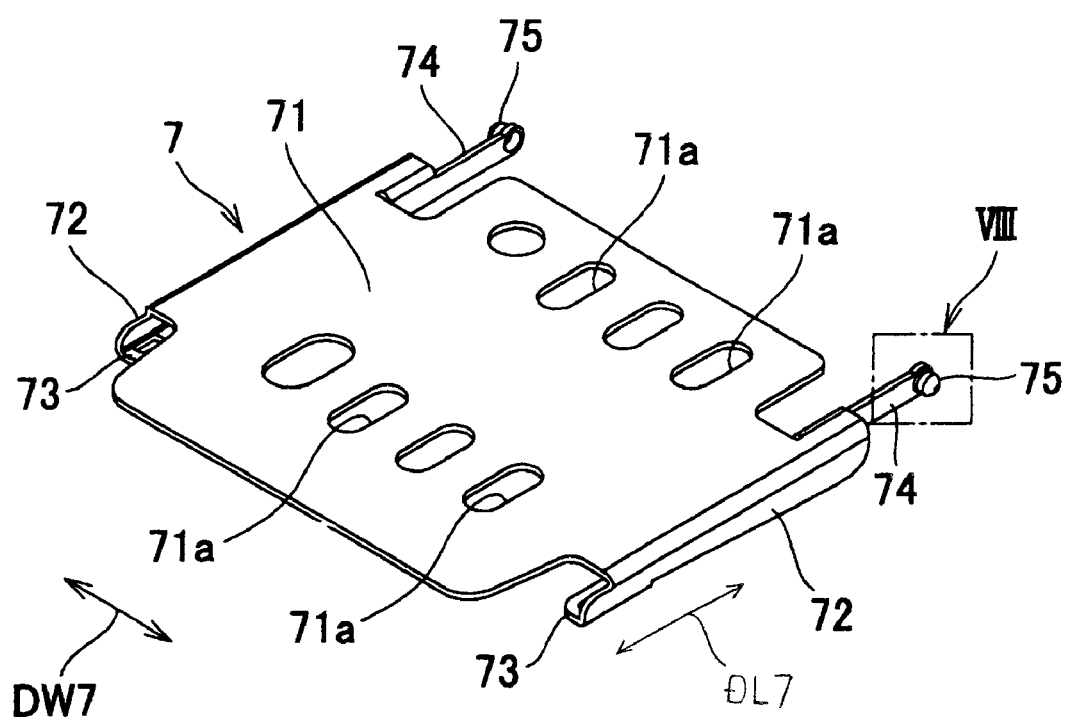
FIG. 5 is a perspective view of the cover of the connector shown in FIG. 1.
Figure 6:
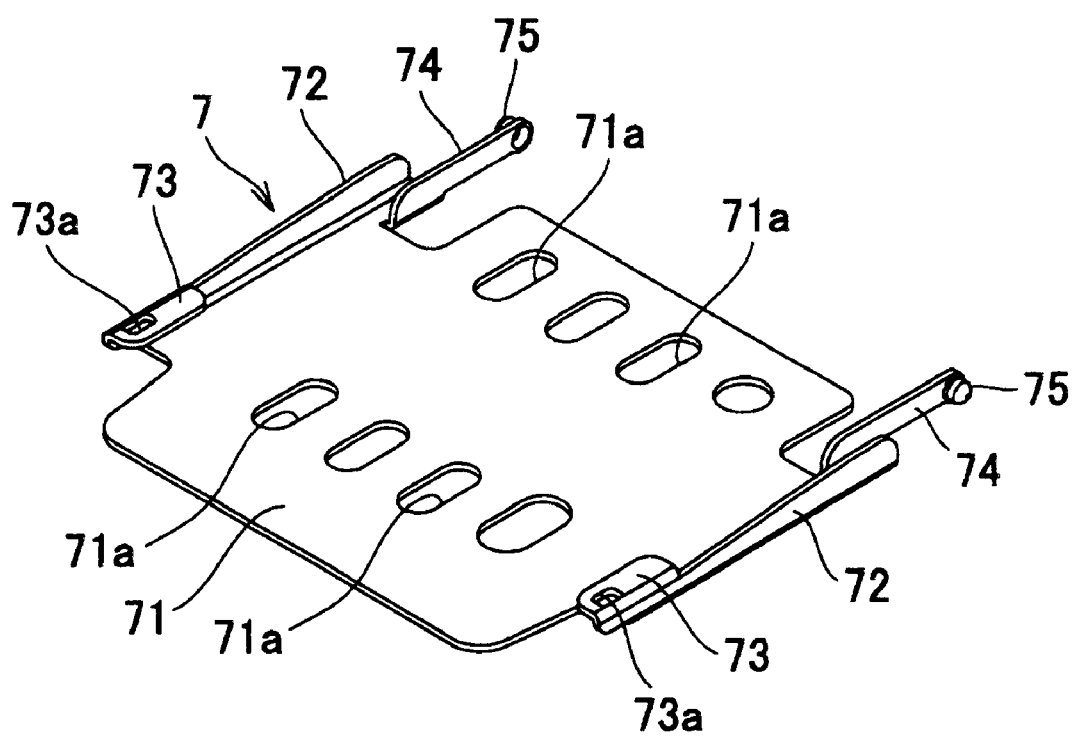
FIG. 6 is a perspective view of the cover shown in FIG. 5 in a state in which the cover is inverted upside down.
Figure 7:
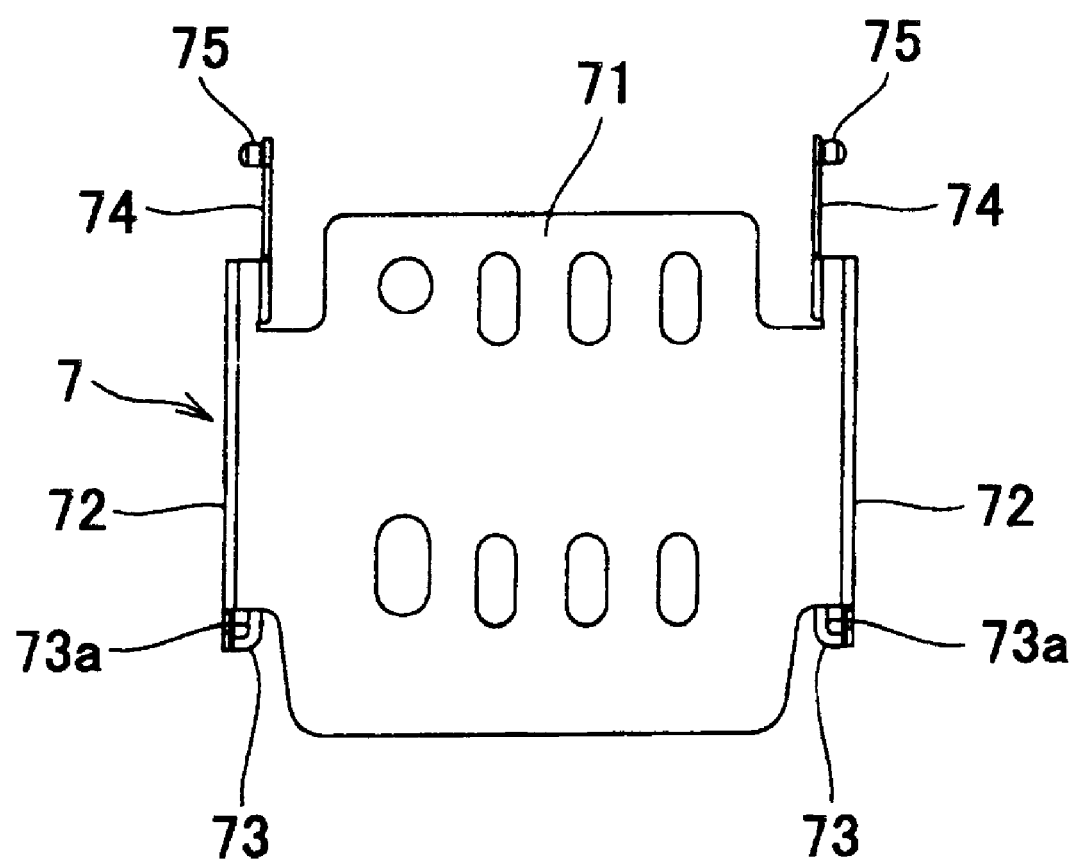
FIG. 7 is a plan view of the cover shown in FIG. 5.
Figure 8:
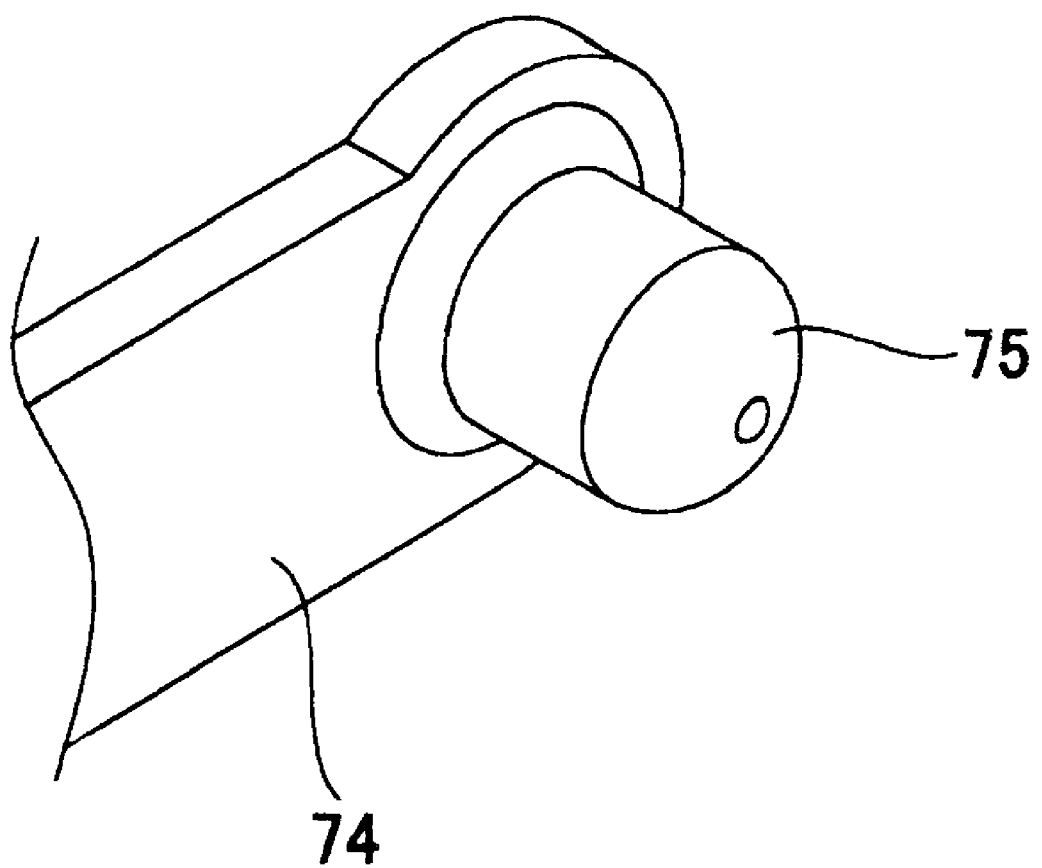
FIG. 8 is an enlarged view of a portion VIII shown in FIG. 5.

As shown in FIGS. 2 to 4, the housing 3 is formed by a base part 31 and an insulator part 32. The housing 3 is substantially tray-shaped, and includes an accommodating section 33 for accommodating the IC card 21 (see FIGS. 1D and 1E).

The base part 31 is substantially plate-shaped (see FIG. 1C), and includes a bottom plate 311, side plates 312 and 312, position-limiting portions (limiting means) 314, upper plates 315 and 315, rear plates 316 and 317, and front plates 318 and 318. The base part 31 is formed by blanking and bending a metal plate.

The bottom plate 311 is formed with two window holes 311a and 311b, and one cutout 311c (see FIG. 1C).

The side plates 312 and 312 are continuous to opposite sides of a rear portion of the bottom plate 311 at right angles, respectively. One side plate 312 (the side plate on the left side as viewed in FIG. 2) has a length shorter than that of the other side plate 312 (the side plate on the right side as viewed in FIG. 2). The side plates 312 and 312 are each formed with a slot (bearing portion) 312a. The slots 312a and 312a are opposed to each other in a direction DW3 of the width of the housing 3 (direction of the width of the IC card 21 accommodated in the housing 3). Further, the slots 312a and 312a each extend in a longitudinal direction (predetermined direction) DL3 of the housing 3.

The position-limiting portions 314 and 314 are continuous to the side plates 312, respectively. As shown in FIGS. 3 and 4, the position-limiting portions 314 each include a pair of linking portions 314a and 314a, and a leaf spring portion (spring portion) 314b. The linking portions 314a and 314a are continuous to respective upper ends of the side plates 312. Each of the linking portions 314a is bent into a substantially J-shape. The leaf spring portion 314b bridges between lower ends of the pair of linking portions 314a. The leaf spring portion 314b has a protrusion 314c formed at a central portion thereof.

The upper plates 315 and 315 are continuous to the upper ends of the side plates 312 and 312 at right angles and cover the leaf spring portions 314b, respectively.

The rear plates 316 and 317 are continuous to a rear end of the bottom plate 311 at right angles. The rear plate 316 is arranged obliquely with respect to one of the side plates 312 (the side plate on the left side as viewed in FIG. 2). The rear plate 316 straightly faces a cutout 212 of the IC card 21 accommodated in the accommodating section 33 of the housing 3 (see FIG. 1E). The rear plate 317 is arranged at right angles to the other side plate 312 (the side plate on the right side as viewed in FIG. 2).

The front plates 318 and 318 are continuous to opposite ends of a front end of the bottom plate 311 at right angles, respectively.

As shown in FIG. 2, the insulator part 32 is substantially plate-shaped, and includes a bottom plate portion 321, first side wall portions 322 and 322, second side wall portions 323 and 323, and front wall portions 324 and 324. The insulator part 32 is formed of an insulating resin. The insulator part 32 is fixed to an upper surface of a front portion of the base part 31, and is made integral with the base part 31.

The substantially rectangular bottom plate portion 321 is formed with six contact-accommodating holes 321a arranged in two rows, front and rear, along the longitudinal direction DL3. The contact-accommodating holes 321a in the respective rows are arranged at equally-spaced intervals along the width direction DW3 of the housing 3. The contact-accommodating holes 321a in the front row (row on the front side as viewed in FIG. 2) are communicated with the window hole 311a of the base part 31. The contact-accommodating holes 321a in the rear row (row on the rear side as viewed in FIG. 2) are communicated with the window hole 311b of the base part 31 (see FIG. 1C).

The first side wall portions 322 and 322 are continuous to respective front portions of opposite sides of the bottom plate portion 321. The first side wall portions 322 each include a locking portion 322a. The locking portion 322a is substantially prism-shaped. The locking portion 322a has a protrusion 322b formed on a lower surface thereof.

The second side wall portions 323 and 323 are continuous to respective rear portions of the opposite sides of the bottom plate portion 321. Spaces 325 are formed between the first side wall portions 322 and 322 and the second side wall portions 323 and 323, respectively.

The front wall portions 324 and 324 are continuous to respective opposite ends of a front portion of the bottom plate portion 321. Front surfaces of the front wall portions 324 and 324 are covered by the respective front plates 318 and 318 of the base part 31.

Each of the contacts 5 includes a contact portion 51, a spring portion 52, a fixing portion (not shown), and a terminal portion 54. The contacts 5 are formed by blanking and bending a metal plate.

The contact portion 51 is located at a front end of each contact 5, and is brought into contact with a pad (not shown) of the IC card 21.

The spring portion 52 is continuous to the contact portion 51, and presses the contact portion 51 against the pad of the IC card 21. The spring portion 52 is accommodated in an associated one of the contact-accommodating holes 321a of the insulator part 32, and the contact portion 51 protrudes upward from the associated one of the contact-accommodating holes 321a.

The fixing portion is continuous to the spring portion 52, and is buried in the vicinity of the associated one of the contact-accommodating holes 321a of the insulator part 32. Thus, the contacts 5 are held by the housing 3.

The terminal portion 54 is continuous to the fixing portion, and protrudes from the bottom plate portion 321 of the insulator part 32. The terminal portion 54 is soldered onto a pad of the printed circuit board, not shown.

The cover 7 covers part of the IC card 21 accommodated in the housing 3 (see FIG. 1E). As shown in FIGS. 5 to 8, the cover 7 includes a cover main body 71, side plates 72 and 72, locking portions 73 and 73, arm portions 74 and 74, and shaft portions 75 and 75. The cover 7 is formed by blanking and bending a metal plate having elasticity. The metal plate, which is thinner than a conventional one, is used as a material of the cover 7 in order to reduce the height of the connector 1.

When the cover 7 covers the IC card 21, the substantially rectangular cover main body 71 is opposed to an upper surface of the IC card 21. The cover main body 71 is formed with six holes 71a arranged in two rows, front and rear, in a longitudinal direction DL7 (see FIG. 5). Each of the holes 71a receives the contact portion 51 of an associated one of the contacts 5, and prevents the contact portion 51 of the associated one of the contacts 5 from being brought into contact with the cover main body 71.

The side plates 72 and 72 are formed by bending opposite sides of the cover main body 71 at right angles with respect to the cove main body 71, respectively.

The locking portions 73 and 73 are formed by bending respective one ends of the side plates 72 and 72 at right angles with respect to the side plates 72 and 72, and are parallel to the cover main body 71. Each of the locking portions 73 is plate-shaped, and has a locking hole 73a.

The arm portions 74 and 74 are formed by bending respective rear portions of the opposite sides of the cover main body 71 at right angles with respect to the cover main body 71. The arm portions 74 and 74 are each plate-shaped, and are capable of being elastically deformed in the thickness direction thereof. The arm portions 74 and 74 are parallel to the side plates 72 and 72, and are located inside the respective side plates 72 and 72 (see FIGS. 1A and 1B). When the IC card 21 is accommodated in the housing 3 (see FIG. 1D), one ends of the arm portions 74 and 74 and the side surfaces of the IC card 21 are opposed to each other, respectively, in the width direction DW3 of the housing 3 with a slight space therebetween (see FIG. 2). Further, when the cover 7 covers the upper surface of the IC card 21 accommodated in the housing 3 (see FIG. 1E), the whole arm portions 74 and 74 are sandwiched between the respective side surfaces of the IC card 21, and the respective side plates 312 and 312 and the respective second side wall portions 323 and 323 of the housing 3.

The shaft portions 75 and 75 are continuous to respective one ends of the arm portions 74 and 74. The shaft portions 75 and 75 each protrude toward the outside of the cover 7 in the width direction DW7 of the cover 7. The shaft portions 75 and 75 are inserted through the respective slots 312a and 312a from inside the housing 3 (accommodating section 33) such that they are pivotally movable and slidable along the longitudinal direction DL3 of the housing 3 (see FIG. 2). As a result, it is possible to open and close the cover 7 with respect to the housing 3, and slide the cover 7 between the locked position (position in which the cover 7 is locked to the housing 3) and the unlocked position (position in which the cover 7 can be opened) along the longitudinal direction DL3 of the housing 3.

Next, a description will be given of how the connector 1 is used. It should be noted that the connector 1 is mounted on the printed circuit board in advance.

Figure 9:
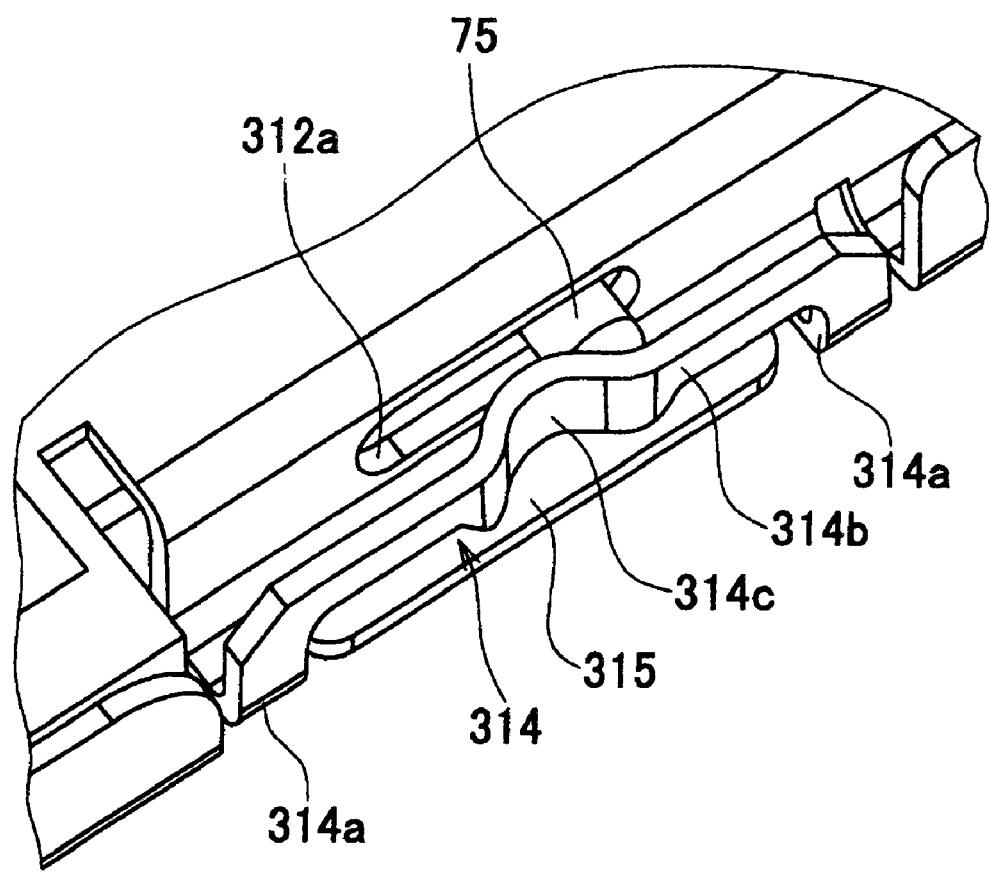
FIG. 9 is an enlarged view showing a relationship between a shaft portion in a locked position and the position-limiting portion.

First, as shown in FIG. 9, each shaft portion 75 of the cover 7 is moved to a rear end (right part as viewed in FIG. 9) of the associated slot 312a of the housing 3 to open the cover 7, as shown in FIG. 1A. At this time, the protrusion 314c of the leaf spring 314b of each position-limiting portions 314 is engaged with the associated shaft portion 75 to thereby limit the movement of the associated shaft portion 75 so as to prevent the associated shaft portion 75 from moving toward a front end (left part as viewed in FIG. 9) of the slot 312a.

Next, as shown in FIG. 1D, the IC card 21 is accommodated in the accommodating section 33 of the housing 3.

Thereafter, the cover 7 is closed. At this time, each locking portion 73 is accommodated in the associated space 325 (see FIG. 1D). Since the locking portions 73 are engaged with nothing, the cover 7 can be opened and closed.

Figure 10:
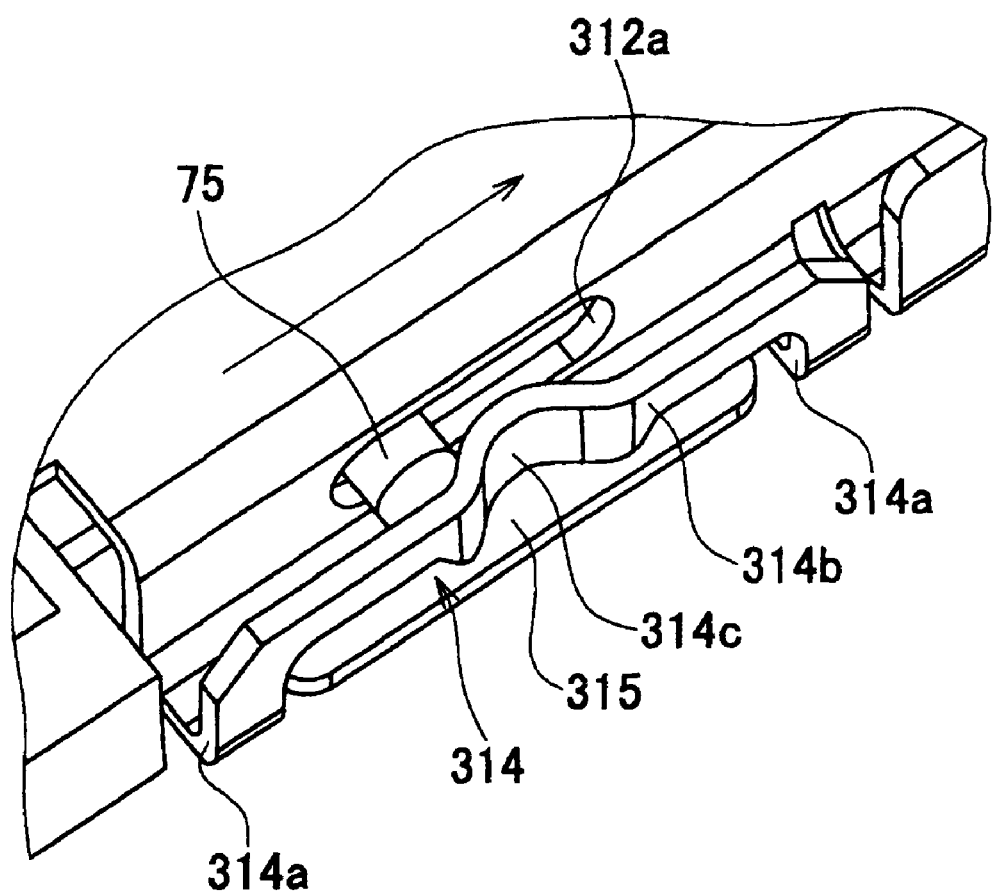
FIG. 10 is an enlarged view showing a relationship between the shaft portion in an unlocked position and the position-limiting portion.

Next, in a state where the cover 7 is closed, the cover 7 is moved toward the locked position. At this time, as shown in FIG. 10, each shaft portion 75 of the cover 7 is moved to the front end of the associated slot 312a of the housing 3. When each shaft portion 75 is moved from the rear end to the front end of the associated slot 312a, each shaft portion 75 pushes away the protrusion 314c of the associated position-limiting portion 314 against the spring force of the leaf spring 314b. As soon as the shaft portion 75 passes the protrusion 314c, the protrusion 314c springs back to the original position by the spring force of the leaf spring 314b. At this time, an operator who operates the cover 7 can sense a click feeling.

When the shaft portion 75 of the cover 7 reaches the front end of the associated slot 312a of the housing 3, the locking portion 73 of the cover 7 is slid under the associated locking portion 322a (see FIG. 2) of the housing 3, and the protrusion 322b of the associated locking portion 322a is fitted in the locking hole 73a of the locking portion 73. As a result, the cover 7 is locked to the housing 3, whereby the cover 7 is prevented from being opened. Further, at this time, the protrusion 314c of the position-limiting portion 314 is engaged with the associated shaft portion 75 of the cover 7 to thereby limit the movement of the associated shaft portion 75 so as to prevent the associated shaft portion 75 from moving toward the rear end of the slot 312a due to external force or the like.

When the cover 7 is locked to the housing 3, the contact portion 51 of each contact 5 is brought into contact with an associated pad of the IC card 21 by the spring force of the spring portion 52. As a result, the IC card 21 is electrically connected to the printed circuit board.

To remove the IC card 21 from the connector 1, first, it is only required to slide the cover 7 from the locked position to the unlocked position to thereby unlock the cover 7, and then open the cover 7 to take out the IC card 21 from the accommodating section 33 of the housing 3.

Figure 11:
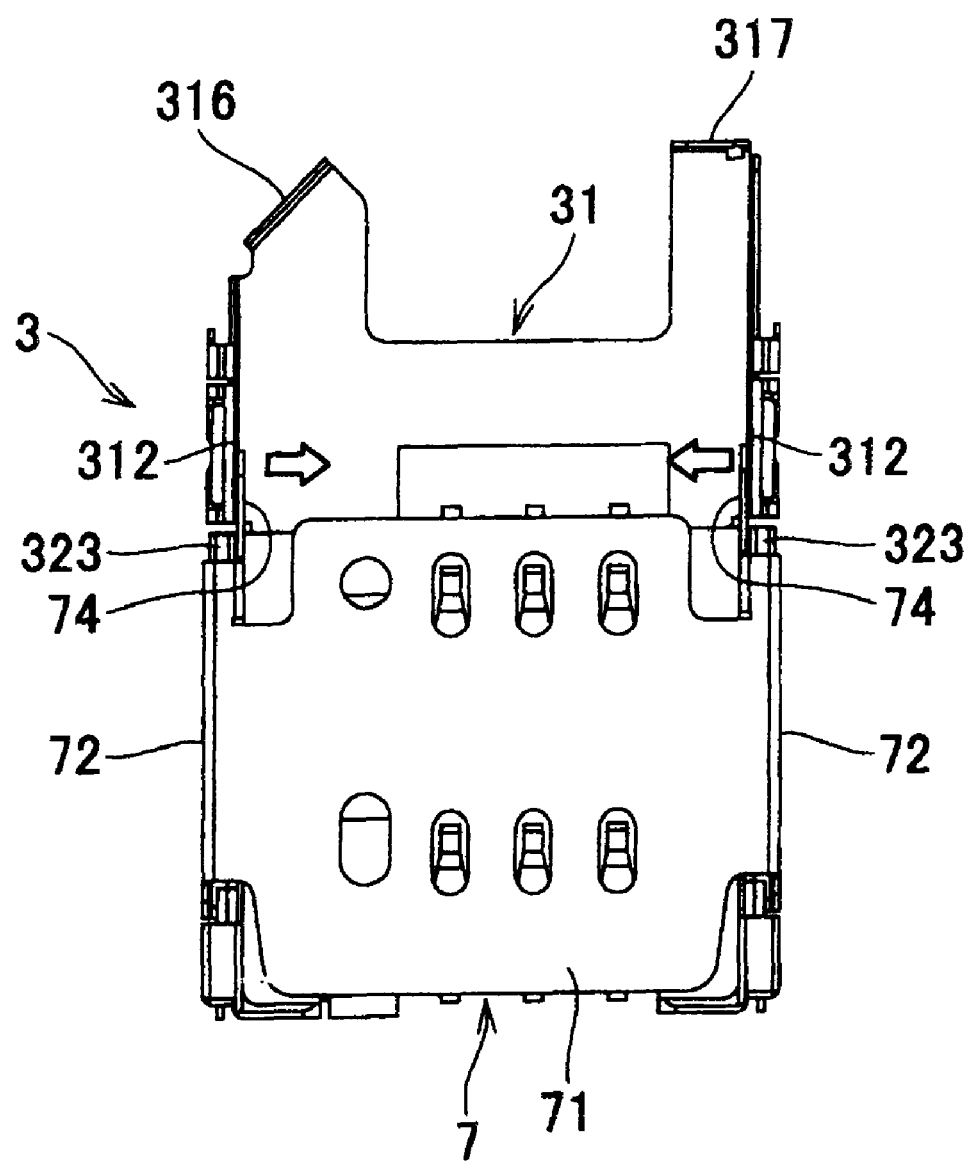
FIG. 11 is a plan view of the connector shown in FIG. 1A in a state in which the cover is closed without accommodating the IC card in the housing.

As shown in FIG. 11, if forces in respective directions indicated by arrows (forces by which the arm portions 74 and 74 approach each other) are applied to the arm portions 74 and 74 of the cover 7, the arm portions 74 and 74 are flexed, whereby the shaft portions 75 and 75 disposed on the respective arm portions 74 and 74 are removed from the respective slots 312a of the housing 3. To the contrary, to insert the shaft portions 75 through the respective slots 312a, the arm portions 74 and 74 are flexed such that the arm portions 74 and 74 approach each other, the shaft portions 75 are aligned with the respective slots 312a, and the forces applied to the arm portions 74 and 74 are gradually reduced, whereby the shaft portions 75 and 75 are inserted through the respective slots 312a and 312a by the returning forces of the arm portions 74 and 74.

Figure 12:
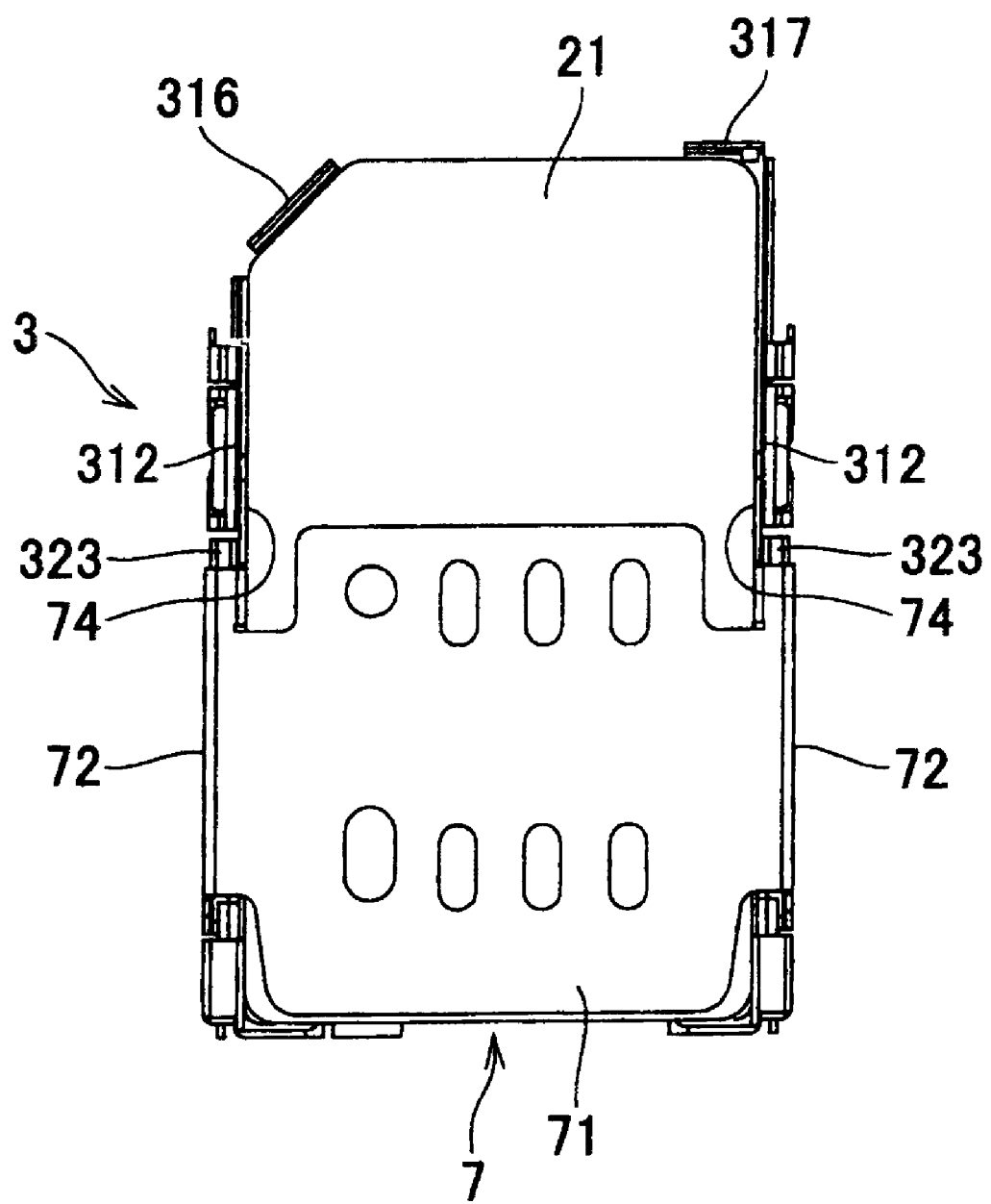
FIG. 12 is a plan view of the connector shown in FIG. 1A in a state in which the IC card is accommodated in the housing, and the cover is closed.
Figure 13:
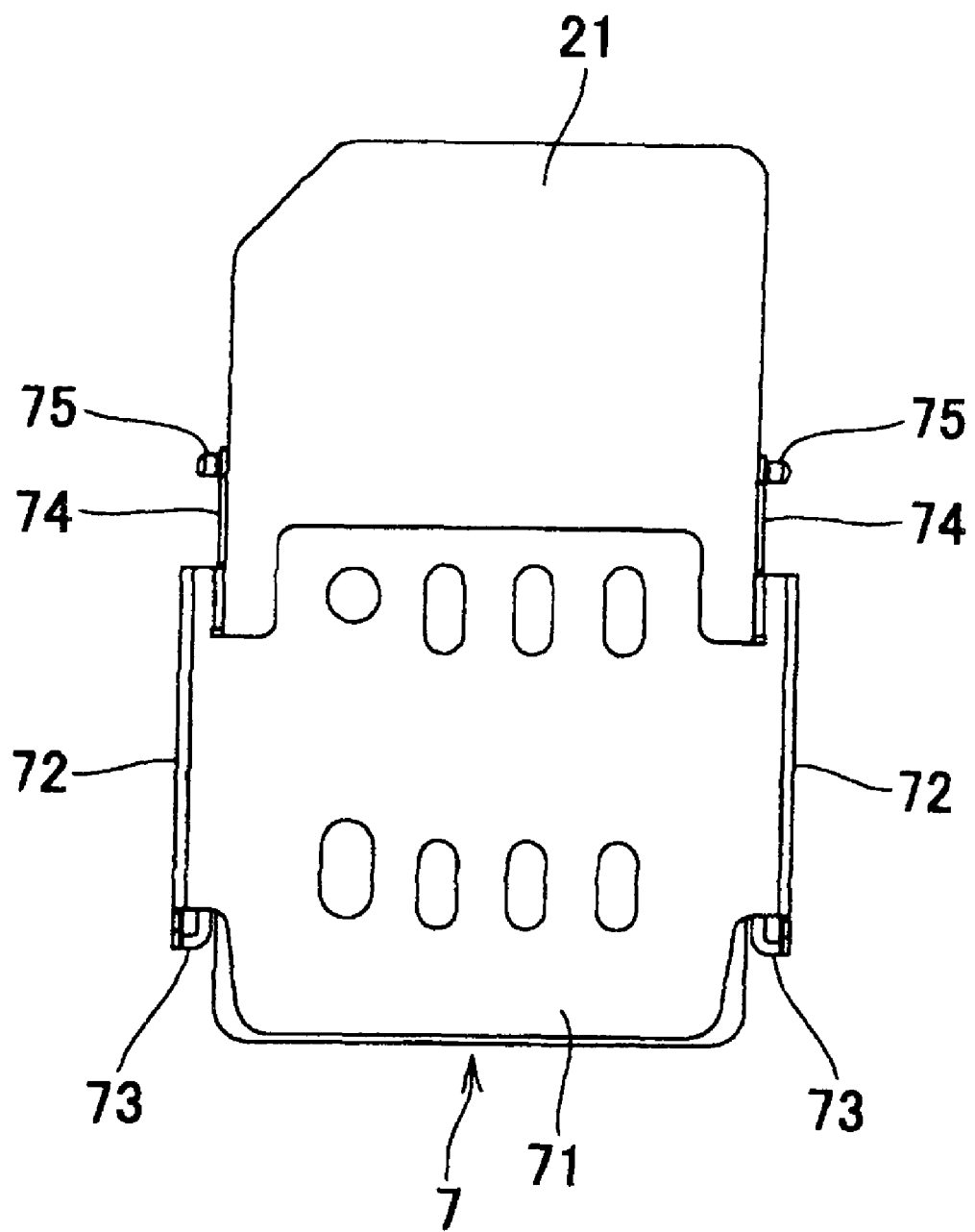
FIG. 13 is a plan view showing a relationship between the cover of the connector shown in FIG. 12 and the IC card.

As shown in FIG. 12, after the IC card 21 is accommodated in the housing 3 and the cover 7 is closed, when the cover 7 is moved to the locked position, the arm portions 74 of the cover 7 are, as shown in FIG. 13, opposed to the respective side surfaces of the IC card 21 with a slight space therebetween, and hence it is not possible to flex the arm portions 74 and 74 in a direction of approaching each other, or twist the arm portions 74 and 74. What is more, since the shaft portions 75 and 75 have a structure to be inserted from inside the housing 3 through the respective slots 312a, even when the connector 1 is dropped by accident, for example, thereby causing a force of separating the cover 7 from the housing 3 to be applied to the cover 7, there is very little possibility that the shaft portions 75 of the cover 7 are removed from the respective slots 312a of the housing 3.

In the connector 1 according to the present embodiment, the arm portions 74 and 74 are sandwiched by the respective side surfaces of the IC card 21, and the respective side plates 321 and the second side wall portions 323 of the housing 3, and hence the effect of preventing the shaft portions 75 of the cover 7 from being removed is enhanced.

As described above, according to the present embodiment, even though the thickness of the cover 7 is reduced in order to reduce the height of the connector 1, it is possible to reduce the possibility that the cover 7 comes off due to a shock or the like.

Further, by making the thickness of the cover 7 thin, the arm portions 74 and 74 are made easier to be flexed, and hence it is possible to more easily perform assembling and repairing of the connector 1.

Further, since the housing 3 is provided with the position-limiting portions 314, it is possible to positively cause the cover 7 to be retained in the locked position or the unlocked position, whereby it is possible to prevent the cover 7 from being slid by accident.

Further, when the cover 7 is slid from the unlocked position to the locked position, or from the locked position to the unlocked position, each shaft portion 75 climbs over the protrusion 314c against the spring force of the leaf spring 314b of the associated position-limiting portion 314, and hence the operator can sense a click feeling.

Further, since the leaf spring 314b of each position-limiting portion 314 is connected to the associated side plate 312 via the J-shaped linking portion 314a, the spring length of the leaf spring 314b is made longer by the length of the linking portion 314a. As a consequence, the spring force is made stronger, which makes it possible to positively latch the shaft portion 75 by the protrusion 314c, and what is more, it is possible to suppress an increase in the size of the position-limiting portion 314.

It should be noted that although in the present embodiment, the IC card 21 is employed as the card-like object to be connected, the card-like object to be connected is not limited to the IC card 21.

Further, although in the present embodiment, the printed circuit board is employed as the other object to be connected, the other object to be connected is not limited to the printed circuit board.

It should be noted that although in the present embodiment, the arm portions 74 and 74 are sandwiched by the respective side surfaces of the IC card 21, and the respective side plates 321 and the respective second side wall portions 323 of the housing 3, it is not necessary to arrange them in this manner, but the arm portions 74 and 74 are only required to be capable of being brought into contact with the respective side surfaces of the IC card 21.

Further, although in the present embodiment, the slots 312a and 312a are formed in the housing 3 as the bearings for the shaft portions 75 and 75, the bearings are not limited to the slots 312a and 312a, but for example, may be grooves.

DESCRIPTION OF REFERENCE NUMERALS 1 connector
3 housing
312 side plate (wall portion)
312a slot (bearing)
314 position-limiting portion (limiting means)
314b leaf spring portion (spring portion)
5 contact
7 cover
71 cover main body
74 arm portion
75 shaft portion
21 IC card (card-like object to be connected)

The invention claimed is:

1. A connector comprising:
a housing having an accommodating section in which a card-like object to be connected is accommodated;
contacts that are held by said housing and are brought into contact with the card-like object to be connected which is accommodated in said accommodating section; and
a cover that covers an upper surface of the card-like object to be connected which is accommodated in said accommodating section,
wherein said cover includes:
a cover main body that is opposed to an upper surface of the card-like object to be connected which is accommodated in said accommodating section;

a pair of arm portions that are continuous to said cover main body, and are capable of being elastically deformed, shaft portions that are continuous to said pair of arm portions, respectively, and are pivotally supported by bearings formed in side plates of said housing;

wherein each of said arm portions is disposed between a side surface of the card-like object to be connected and one of the side plates, and is capable of being brought into contact with the side surface of the card-like object to be connected when said cover main body covers the upper surface of the card-like object to be connected; and wherein said shaft portions are inserted into said bearings from said accommodating section.

2. The connector as claimed in claim 1, wherein each bearing comprises a slot which extends in a predetermined direction, and each shaft portion is supported by the slot to be movable between a locked position in which said cover main body is locked to said housing and an unlocked position in which said cover main body can be opened.

3. The connector as claimed in claim 1, wherein said housing is provided with limiting means for limiting movement of each shaft portion in a locked position toward an unlocked position, and limiting movement of each shaft portion in the unlocked position toward the locked position.

4. The connector as claimed in claim 2, wherein said housing is provided with limiting means for limiting movement of each shaft portion in the locked position toward the unlocked position, and limiting movement of each shaft portion in the unlocked position toward the locked position.

5. The connector as claimed in claim 3, wherein said limiting means includes a spring portion which is brought into contact with each shaft portion by a predetermined force, when said limiting means moves said shaft portion between the locked position and the unlocked position.

6. The connector as claimed in claim 4, wherein said limiting means includes a spring portion which is brought into contact with each shaft portion by a predetermined force, when said limiting means moves said shaft portion between the locked position and the unlocked position.

* * * * *